United States Patent [19]

Curry

[11] Patent Number: 4,937,031

[45] Date of Patent: Jun. 26, 1990

[54] PROCESS FOR PREPARING THERMOPLASTIC COMPOSITES

[75] Inventor: Herbert L. Curry, Mt. Vernon, Ind.

[73] Assignee: General Electric Company, Pittsfield, Mass.

[21] Appl. No.: 273,246

[22] Filed: Nov. 18, 1988

[51] Int. Cl.$^5$ .................. B29C 47/06; B32B 27/08; B32B 31/30

[52] U.S. Cl. .................. 264/171; 264/176.1; 428/412; 428/447

[58] Field of Search .............. 264/171, 176.1; 428/412, 447

[56] References Cited

U.S. PATENT DOCUMENTS

| | | |
|---|---|---|
| 3,397,428 | 8/1968 | Donald .................. 264/171 X |
| 3,520,768 | 7/1970 | Peilstocker et al. . |
| 3,565,985 | 2/1971 | Schrenk et al. .................. 264/171 |
| 3,666,614 | 5/1972 | Snedeker et al. . |
| 3,979,548 | 9/1976 | Schafer et al. . |
| 4,027,072 | 5/1977 | Molari, Jr. .................. 428/412 |
| 4,204,026 | 5/1980 | LeGrand et al. .................. 428/412 X |
| 4,312,903 | 1/1982 | Molari, Jr. .................. 428/412 X |

*Primary Examiner*—Jeffery Thurlow
*Assistant Examiner*—Leo B. Tentoni
*Attorney, Agent, or Firm*—Spencer D. Conard

[57] ABSTRACT

Thermoplastic composites of polycarbonate and siloxane-polycarbonate block copolymer layers are produced by a coextrusion process. The composites are useful for the production of high-strength and impact resistant laminate glazing panels.

14 Claims, No Drawings

4,937,031

PROCESS FOR PREPARING THERMOPLASTIC COMPOSITES

BACKGROUND OF THE INVENTION

The present invention relates to processes for preparing thermoplastic composites. More particularly, the present invention relates to processes for preparing composites of a polycarbonate with an elastomeric siloxane-polycarbonate block copolymer.

Safety glazing or penetration resistant glazing for structural items such as windows, windshields and the like including multiple glass and/or high-strength polymeric structural layers are well-known. Glass and polycarbonate resin laminates are disclosed in U.S. Pat. No. 3,666,614, the glass and polycarbonate being sealed or joined together by an ethylene-vinyl acetate copolymer. In U.S. Pat. No. 3,520,768, there are disclosed laminates of relatively thick glass sheets with a thin polycarbonate foil disposed between the glass sheets as the cohering material. Also known (from U.S. Pat. No. 3,979,548) are laminates wherein self-healing, chemically resistant polyurethane films or layers are adhered to glass. U.S. Pat. No. 4,027,072 discloses laminates comprising polycarbonates and siloxane polycarbonate block copolymers and glass in various combinations and in which an ultraviolet, mar resistant, hard coat is utilized on at least one external surface or both external surfaces of such laminates. U.S. Pat. No. 4,204,026 discloses glass-polycarbonate laminates wherein the glass and polycarbonate are bonded together by a bonding system comprised of an aminoalkyl tris[poly-(aryloxysiloxane)] primer and a siloxane-polycarbonate block copolymer bonding agent. U.S. Pat. No. 4,312,903 discloses multi-ply laminates which contain polycarbonate layers bonded into the laminates with a siloxane-polycarbonate block copolymer. These last-mentioned laminates are particularly useful in structural items such as bullet resistant glass, windshields, windows and as transparencies for gas masks and the like. It is normal practice in constructing certain of such laminates to utilize glass or relatively hard solid resinous materials as impact- or shock-receiving layers and to utilize polycarbonate as the layer presented to the person or object being protected.

The above-described laminates have been prepared by so-called "laying up" of the laminate. Such laying up involves physically placing the individual sheets in contact with one another and bonding them together by means of heat and pressure. This procedure suffers from certain disadvantages. The laying up procedure is often done by hand or is only semi-automated and thus is labor intensive. In addition, it is difficult to exclude airborne particulate matter from the sheets during the laying up procedure. When trapped between the sheets, such particulate matter decreases the optical clarity and aesthetic appearance of the laminate and, in extreme cases, can lead to subsequent delamination.

A need exists for an efficient method for preparing such laminates which reduces the overall labor requirement and which minimizes the chances of trapping contaminating particulate matter within the laminate.

SUMMARY OF THE INVENTION

In accordance with the present invention, a process for preparing a composite of a polycarbonate with a siloxane-polycarbonate block copolymer comprises coextruding the polycarbonate and siloxane-polycarbonate block copolymer. The use of the coextrusion process avoids the need to lay up the polycarbonate and siloxane-polycarbonate block copolymer layers and thus greatly reduces the occurrence of undesirable trapped foreign matter within the finished product. The coextruded product is useful for the production of high-impact strength safety and penetration resistant glazing panels.

DETAILED DESCRIPTION OF THE INVENTION

Procedures for coextruding composites of thermoplastic sheets and films are generally known. Such procedures are described, for example, in the Modern Plastics Encyclopedia, Vol. 64, No. 10A, pp. 228–238, McGraw Hill, October, 1987. Coextruded sheets and films are made for example using a multi-manifold die such as a coextrusion feedblock for flat cast film and sheet. Procedures and equipment for coextrusion of multi-layered sheets and films are described in detail by M. H. Naitove, *Plastics Technology*, February 1977, pp. 61–71.

In the present invention, polycarbonate and siloxane-polycarbonate block copolymer thermoplastics are coextruded to form multi-layered composites which take advantage of the various properties of the different layers. The composites are prepared as sheets including at least one thermoplastic layer consisting of polycarbonate and at least one adjacent thermoplastic layer consisting of siloxane-polycarbonate block copolymer. These polycarbonate and siloxane-polycarbonate block copolymer composites are useful for further processing into e.g. high strength glazing laminate panels. Depending on the ultimate use of the composites, a siloxane-polycarbonate block copolymer layer may be disposed on one or both sides of the polycarbonate layer. The siloxane-polycarbonate block copolymer may serve as an adhesive layer for bonding the composite to other sheet materials, such as glass or polycarbonate.

As used herein, the term "polycarbonate" includes polymers prepared by reacting a dihydric phenol with a carbonate precursor as well as copolyestercarbonates, which are prepared by reacting an aromatic dicarboxylic acid or reactive derivative thereof, a dihydric phenol and a carbonate precursor.

Because the melt flow characteristics of siloxane-polycarbonate block copolymers differ substantially from those of polycarbonates, composites of these materials have not heretofore been prepared by coextrusion. It has now been found that optically clear composites, having strong inter-layer bonds can be prepared by coextrusion. Moreover, such composites can be prepared without using an adhesive between the layers of the composites.

Generally, any polycarbonate resin can be used in the composites of the present invention including but not limited to those described in U.S. Pat. Nos. 3,161,615; 3,220,973; 3,312,659; 3,312,660; 3,313,777; 3,666,614; and 3,989,672, all of which are incorporated herein by reference. Generally, carbonate polymers used in the instant composites are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors and generally contain recurring structural units of the formula:

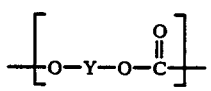

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3,'5'-tetrachloro-4,4'-dihydroxyphenyl)propane, 2,2-(3,5,3',5'-tetrabromo-4,4'-dihydroxyphenyl)propane, and 3,3'-dichloro-4,4'-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with a hydroxy or acid terminated polyester, or with a dibasic acid in the event a carbonate copolymer or interpolymer rather than a homopolymer is desired for use in the preparation of the composites of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate, di(chloronaphthyl)carbonate, etc., di(naphthyl)carbonate, di(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5.

The polycarbonates of the subject composites can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, benzophenonetetracarboxylic anhydride, and the like. The preferred polyfunctional aromatic compounds are trimellitic anhydride and trimellitic acid or their acid halide derivatives.

Exemplary polycarbonate resins are those derived from the reaction of bisphenol-A and carbonyl chloride. These polycarbonates have from 10–400 recurring units of the formula:

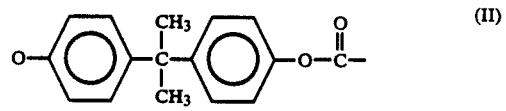
(II)

The siloxane-polycarbonate block copolymers employed in the composites prepared by the process of this invention can be represented by the structural formula:

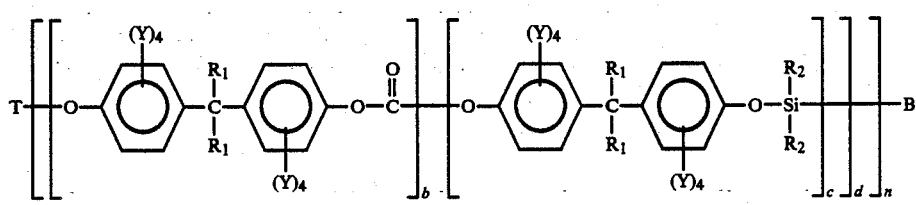

where n is at least 1, and preferably n is an integer equal to from 1 to about 1000, inclusive, b is equal to from 1 to about 200, inclusive, c is equal to from about 5 to about 200, inclusive, and preferably c has an average value from about 15 to about 90, inclusive, and, while the ratio of b to c can vary from about 0.05 to about 3, inclusive, when c has an average value of from about 15 to about 90, inclusive, the ratio of b to c is preferably from about 0.067 to about 0.45, inclusive, d is 1 or more, u is an integer from 1 to 4 inclusive, B is

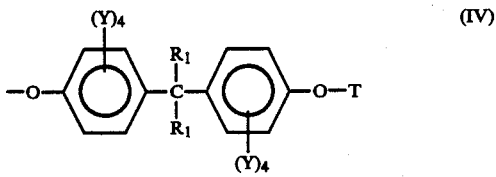

(IV)

where T is member selected from hydrogen and

(V)

$R_1$ is a member selected from the class of hydrogen, monovalent hydrocarbon radicals and halogenated monovalent hydrocarbon radicals, $R_2$ is a member selected from the class of monovalent hydrocarbon radicals, halogenated monovalent hydrocarbon radicals and cyanoalkyl radicals, $R_3$ is a member selected from the class consisting of monovalent hydrocarbon radicals and halogenated hydrocarbon radicals, and Y is a member selected from the class consisting of hydrogen, lower alkyl radicals and halogen radicals and mixtures thereof.

Included within the radicals represented by $R_1$ are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; $R_1$ can be all the same radical or any two or more of the aforementioned radicals, and $R_1$ is preferably methyl. $R_2$ includes all radicals included by $R_1$ above except hydrogen, where $R_2$ also can be all the same radical or any two or more of the aforementioned $R_1$ radicals except hydrogen, cyanoalkyl radicals such as cyanoethyl, cyanobutyl, etc., radicals, and $R_2$ is preferably methyl. Radicals that are included within the definition of Y are hydrogen, methyl, ethyl, propyl, chloro, bromo, iodo, etc., and combinations thereof, and Y is preferably hydrogen.

The hydrolytically stable copolymers used in the composites of the present invention can be further described as comprising recurring copolymeric units of a polydiorganosiloxane joined by substituted aryloxysilicon linkages to a polyester of dihydric phenol and a precursor of carbonic acid, where each of said recurring copolymeric units comprises by average weight from 10% to about 75% of said polydiorganosiloxane, and preferably from about 40 to 70% by weight. Copolymers of the above nature are described in U.S. Pat. No. 3,189,662, incorporated herein by reference, and can be used either alone as such or in conjunction with well known modifiers to provide particular desired characteristics to the blends.

Preparation of these copolymers is described in U.S. Pat. No. 4,616,042 to R. W. Avakian and which is incorporated by reference herein for that purpose.

Illustrative of the commercially available polycarbonates are those sold under the LEXAN trademark by the General Electric Company, Pittsfield, Mass. Commercially available siloxane-polycarbonate block copolymers are exemplified by General Electric LR-3320. This material has a specific gravity of 1.12, tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F. Another such commercially available block copolymer, General Electric LR-5530, has a specific gravity of 1.07, a tensile strength of 2200 to 2500 psi, an elongation of 500–700%, a tear (Die C) of 200 lbs/in., a brittleness temperature below −76° F. and a heat deflection temperature (66 psi) of 130° F.

The composites which result from the process of this invention generally have a polycarbonate layer thickness ranging from about 0.05 to about 0.25, preferably from about 0.1 to about 0.2 inches. The thickness of the siloxane-polycarbonate block copolymer layer advantageously ranges from about 0.005 to about 0.1 inches, preferably from about 0.01 to about 0.05 inches. The siloxane-polycarbonate block copolymer layer may be applied to one or both sides of the polycarbonate layer.

The process of this invention employs coextrusion equipment generally known in the art. Such coextrusion equipment includes separate extruders for each layer, a heated feed block and a standard multi-manifold die. Calender rolls may be positioned downstream from the die to control overall sheet thickness and surface texture.

The temperature profiles used in the extruders will depend upon the particular thermoplastics used. Such temperature profiles may be determined empirically, and are such as to provide a suitable melt viscosity and flow into the feed block. In general, for polycarbonate resins, the extruder will be operated within a temperature ranging from about 475° F. to about 530° F. For the siloxane-polycarbonate block copolymer, the extruder temperature will range from about 450° F. to about 500° F.

As noted above, the melt viscosity of the siloxanepolycarbonate block copolymer differs substantially from that of the polycarbonate. Surprisingly, it has been found that, notwithstanding these differences, high quality composites of these two materials can be prepared by the coextrusion process. The melt flow rate of the different polymers into the feed block should be substantially the same. These flow rates are controlled by controlling the shear force in the extruders, the extruder temperatures and the temperature of the feed block and the die. The temperature of the feed block typically ranges from about 450° F. to about 525° F., preferably from about 475° F. to about 500° F.

Those skilled in the art will appreciate that the specific conditions used may vary, and will depend upon the characteristics of the polymers, the particular equipment employed and the layer thicknesses of the desired composite. The present invention can be practiced, however, as long as the melt flow rates of the two polymers are substantially the same. The invention is further illustrated by the following example which is not intended to limit the invention.

EXAMPLE

Polycarbonate resin (Lexan grade 100, General Electric Company, Pittsfield, Mass.) and siloxane-polycarbonate block copolymer (LR 3320, General Electric Company) were coextruded through an Extrusion Die Inc. die. The polycarbonate was extruded through a 2¼ inch diameter H.P.M. extruder having the temperature profile of Zone 1 at 475° F., Zone 2 at 490° F., Zone 3 at 500° F., Zone 4 at 510° F., Zone 5 at 530° F., and adaptor Zone 1 at 525° F. The extruder was operated at a screw speed of 40 RPM with a barrel pressure of 1000 psig. The motor drive load was 15 amps. The siloxane-polycarbonate block copolymer was extruded through a 2 inch diameter H.P.M. extruder. The extruder had a temperature profile which included Zone 1 at 440° F., Zone 2 at 500° F., Zone 3 at 520° F., Zone 4 at 530° F,, and the adaptor Zone at 525° F. This extruder was operated at a screw speed of 34 RPM with a barrel pressure 1200 psig. The motor drive load was 50 amps. The output from the two extruders was passed through a coextrusion feedblock manufactured by Cloeren and operating at an adaptor temperature at Zone 1 at 520° F. The composite from the coextrusion adaptor went to a die having 5 zones operating at about 520° F. The coextruded sheet was then cast on a roll at 170° F., followed by a cooling roll at 160° F.

The resulting sheet had a total thickness of 0.160 inches with the following layers: 0.125 inches of polycarbonate 0.035 inches of siloxane-polycarbonate copolymer.

I claim:
1. A process for making a composite of a polycarbonate and a siloxane-polycarbonate block copolymer which comprises coextruding the polycarbonate and the siloxane-polycarbonate block copolymer.

2. A process of claim 1 further comprising adjusting melt flow rates of the polycarbonate and the siloxane-polycarbonate block copolymer to substantially equal values prior to the coextruding step.

3. A process of claim 1 or 2 wherein said siloxane-polycarbonate block copolymer is a compound of the general formula

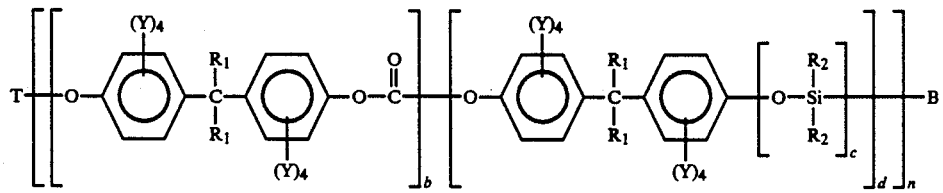

where n is at least 1, inclusive, b is equal to from 1 to about 200, inclusive, c is equal to from about 5 to about 200, inclusive, the ratio of b to c being from about 0.05 to about 3, d is at least 1, B is

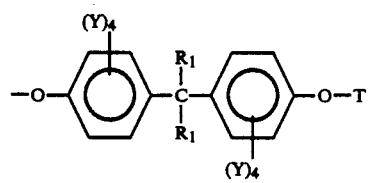

where T is member selected from the group consisting of hydrogen and

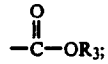

$R_1$ is a member selected from the group consisting of hydrogen, monovalent hydrogen radicals and halogenated monovalent hydrocarbon radicals, $R_2$ is a member selected from the group consisting of monovalent hydrocarbon radicals, halogenated monovalent hydrocarbon radicals and cyanoalkyl radicals, $R_3$ is a member selected from the group consisting of monovalent hydrocarbon radicals and halogenated hydrocarbon radicals, and Y is a member selected from the group consisting of hydrogen, lower alkyl radicals and halogen radicals and mixtures thereof.

4. A process of claim 3 wherein n is an integer equal to from 1 to about 1000.

5. A process of claim 3 wherein c has an average value from about 15 to about 90 inclusive and the ratio of b to c is from about 0.067 to about 0.45 inclusive.

6. A process of claim 1 or 2 wherein said polycarbonate is extruded at a temperature from about 475° F. to 530° F.

7. A process of claim 1 or 2 wherein said siloxane-polycarbonate block copolymer is extruded at a temperature from about 450° F. to about 500° F.

8. A process of claim 1 or 2 wherein the polycarbonate is coextruded into a layer having a thickness selected from between about 0.05 and 0.25 inches and the siloxane-polycarbonate block copolymer is coextruded into a layer having a thickness selected from between about 0.005 and about 0.1 inches.

9. A process of claim 1 or 2 wherein the polycarbonate is coextruded into a layer having a thickness selected from between about 0.1 and 0.2 inches and the siloxane-polycarbonate block copolymer is coextruded into a layer having a thickness selected from between about 0.01 and 0.05 inches.

10. A process of claim 1 wherein the composite consists essentially of a polycarbonate layer with a siloxane-polycarbonate block copolymer layer disposed on one side thereof.

11. A process of claim 1 wherein the composite consists essentially of a polycarbonate layer with a siloxane-polycarbonate block copolymer layer on each side thereof.

12. A process of claim 3 wherein $R_1$ is methyl.
13. A process of claim 3 wherein $R_2$ is methyl.
14. A process of claim 3 wherein Y is hydrogen.

* * * * *